(12) United States Patent
Duden et al.

(10) Patent No.: US 7,506,841 B2
(45) Date of Patent: Mar. 24, 2009

(54) CATALYZED DECOMPOSING FOAM FOR ENCAPSULATING SPACE-BASED KINETIC OBJECTS

(75) Inventors: Quenten E Duden, Tucson, AZ (US); Allan T. Mense, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 512 days.

(21) Appl. No.: 10/969,724

(22) Filed: Oct. 20, 2004

(65) Prior Publication Data

US 2006/0048667 A1   Mar. 9, 2006

Related U.S. Application Data

(63) Continuation-in-part of application No. 10/920,976, filed on Aug. 18, 2004.

(51) Int. Cl.
  *B64G 1/36* (2006.01)
(52) U.S. Cl. .............. 244/171.7; 244/173.1; 244/173.3; 89/1.11; 428/305.5; 252/363.5; 401/96

(58) Field of Classification Search .............. 244/171.1, 244/173.3, 171.7; 89/1.11; 428/305.5; 252/363.5; 401/96
  See application file for complete search history.

(56) References Cited

U.S. PATENT DOCUMENTS

| | | |
|---|---|---|
| 3,863,254 A | 1/1975 | Turner |
| 4,076,655 A | 2/1978 | Finberg |
| 2004/0200380 A1 | 10/2004 | Lloyd |

FOREIGN PATENT DOCUMENTS

| | | |
|---|---|---|
| EP | 0718590 | 6/1996 |
| GB | 1430085 | 3/1976 |

*Primary Examiner*—J. Wiidriw Eldred
(74) *Attorney, Agent, or Firm*—David W. Collins

(57) ABSTRACT

A high energy, e.g., ultraviolet (UV) catalyzed decomposing foam encapsulating kinetic media forms a payload to be boosted in space and provides an ultra-light weight means for intercepting an incoming missile or other target. The decomposed foam releases the kinetic media (at designed rates so as to preserve a required density of media on target) to intercept a target and destroy it. The use of the decomposing foam significantly lowers the weight and cost and improves the probability of success of destroying the target.

39 Claims, 1 Drawing Sheet

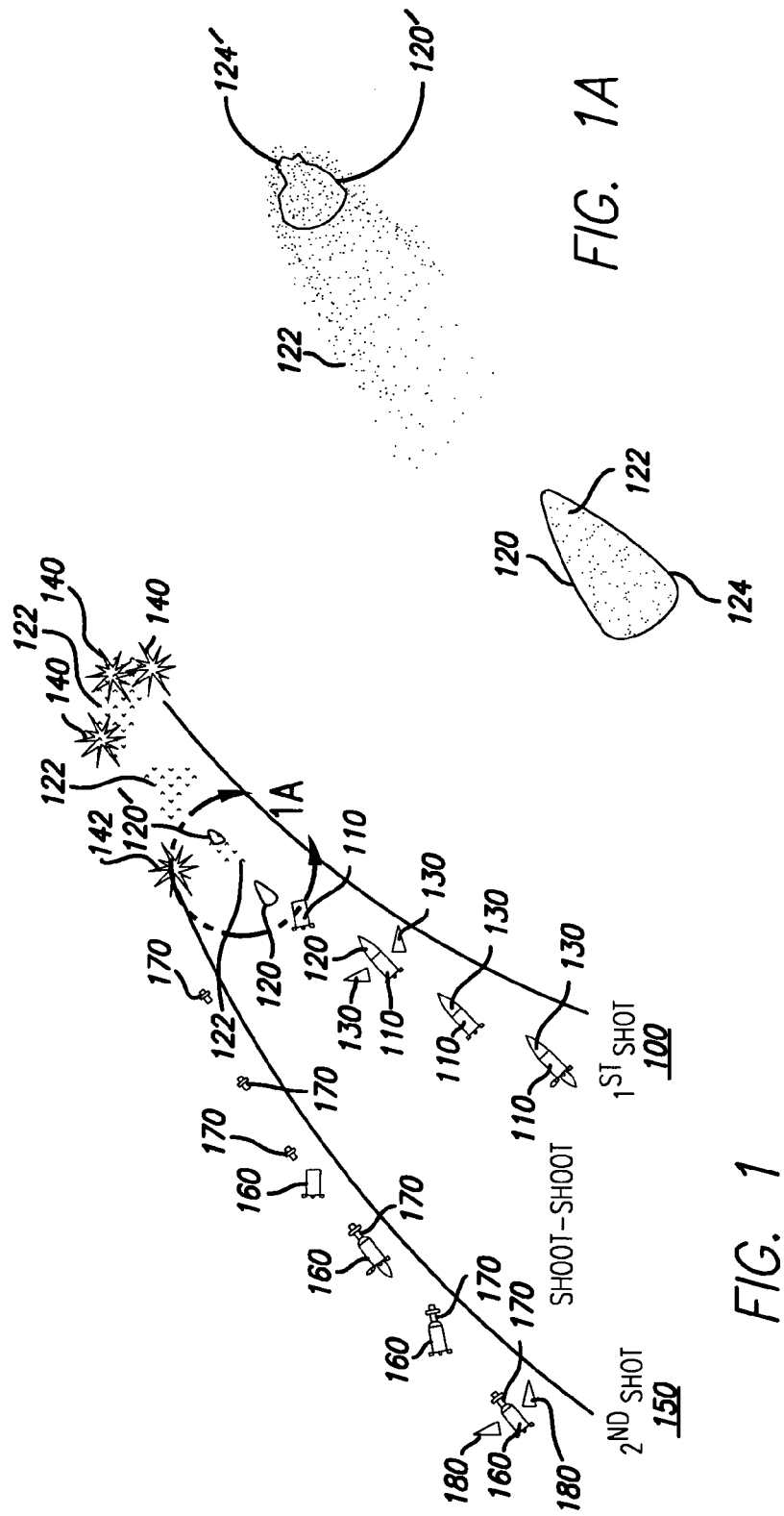

CATALYZED DECOMPOSING FOAM FOR ENCAPSULATING SPACE-BASED KINETIC OBJECTS

CROSS-REFERENCE TO RELATED APPLICATION

The present application is a continuation-in-part of application Ser. No. 10/920,976, filed Aug. 18, 2004, the contents of which are incorporated herein by reference.

TECHNICAL FIELD

The present invention relates generally to containing the dispersion of payload contents in a controlled kinetic environment when launched or orbiting in space, and, more particularly, to the use of decomposable structural payload foam for encapsulating and supporting the payloads, thus reducing weight, isolating from vibration, and maintaining alignment of critical payload elements, while preventing premature dispersion (both longitudinally and transversely) of payload contents.

BACKGROUND ART

Over the last twenty years, countries including the United States have conceived, produced and deployed defensive kinetic energy kill weapons (KW) to mitigate the growing world threat of inter-continental ballistic missiles (ICBMs). Many of these anti-weapon weapons employ a dynamically real time controlled closed loop seeker/tracker to acquire, discriminate, track and destroy an ICBM. Such a closed loop requires significant technology to perform proficiently.

In lieu of this difficult approach, scientists have considered what could be called "the shot-gun approach". This method would send a "pattern" of kinetic media towards an incoming target and avoid the problem of having a single speeding bullet hit a speeding incoming bullet that is intrinsic with the state-of-the-art single, controlled Kill Vehicle (KV) approach. A shotgun approach to distributing this media has its limitations, namely, limiting the "pattern" dispersion until close to impact and delivering enough shrapnel on target to ensure destruction of the target.

Targets of interest include but are not limited to; ICBMs, ICBM decoys, remote vehicles, satellites, and unwanted space debris (including use to de-orbit out-of-commission satellites).

There is a need for a means that would permit a payload of kinetic media to be boosted in space that would provide an ultra-light weight, adaptable means to facilitate delivery of dispersion-controlled kinetic media to a number of targets.

DISCLOSURE OF INVENTION

In accordance with an aspect of the present invention, a payload comprising kinetic media embedded in, or at least partially surrounded by, foam decomposable by high energy electromagnetic radiation is launched into space by a vehicle to intercept a missile. Once in space, the foam is decomposed by exposure to high energy electromagnetic radiation and will release the kinetic media for interception of the missile or other target(s). This technique is a low cost method of controlling the dispersion pattern at the target thus assuring better probability of target interception and in addition not creating detectable or dangerous orbital debris.

Further in accordance with an aspect of the present invention, a vehicle for launching a payload comprising kinetic media into space to intercept a missile is provided, wherein the kinetic media is contained by the decomposable foam that at least partially surrounds it.

Still further in accordance with an aspect of the present invention, a method is provided for protecting a payload during launch into space to intercept a missile. The method comprises:

protecting the payload by partially surrounding said payload with decomposable foam that is decomposable by high energy electromagnetic radiation;

launching the payload while maintaining its structural integrity and alignment; and decomposing the foam once the payload is in space by exposure to high energy electromagnetic radiation.

BRIEF DESCRIPTION OF THE DRAWINGS

FIG. 1 is a schematic view, illustrating a two-shot sequence employing kinetic media, encapsulated in decomposable foam, to intercept a target and destroy it in accordance with an embodiment of the present invention; and FIG. 1A is an enlargement of a portion of FIG. 1.

BEST MODES FOR CARRYING OUT THE INVENTION

An ultra-violet (UV) catalyzed sublimating foam encapsulating a kinetic media payload to be boosted in space provides an ultra-light weight, adaptable means to facilitate delivery of dispersion-controlled kinetic media on a number of targets, such as, but not limited to, ICBMs, ICBM decoys, remote vehicles, satellites, and unwanted space debris (including use to de-orbit out-of-commission satellites). By "kinetic media" is meant any material possessing a critical amount of kinetic energy to render ineffective a selected target. Examples of kinetic media include, but are not limited to, particles of silicon (elemental), silicon alloys, and oxides, as well as flak, ferrous and non-ferrous shrapnel, plastics, long chain polymers, explosives, and any organics with a designed density sufficient to complete the stated objective (namely, destroy the target) or active media that could destroy the targets or render them harmless or render them more easily recognizable or more easily discriminateable.

By embedding the kinetic material in the decomposable foam, one can control the dispersion of this kinetic media for either counter space-asset destruction (e.g., breaking up of large orbital debris into smaller less destructive sizes) or for discrimination of warheads from decoys on incoming ballistic missile payloads.

UV catalyzed sublimating media significantly lower the weight, structure, and complexity of traditional methods (such as mechanical delivery mechanisms) that might be employed to deliver kinetic media on targets. Because of its reduced weight and complexity, this delivery media would be especially beneficial where several or even hundreds of satellites are required for a constellation defense system. In addition to weight and cost savings, advantages of this foam are many in that it is adaptable to any payload shape as it can be injected, sprayed, formed, molded, easily cut, or manufactured to support any geometry required.

Organic and/or inorganic foam is doped (both mechanically and to sublimate) to abate and attenuate specific environmental frequencies in order to successfully support kinetic media being boosted into orbit. Once in orbit, the payload shroud opens, thereby exposing this structural media to the intense UV environment of space. This UV energy catalyzes the decomposition of the (doped) foam, thereby exposing the kinetic media to be delivered to the target. The foam is designed to accentuate the natural tendencies of light-irradiated reactions in that they occur with most volatility against low wave UV (<290 nm) readily available in space and naturally filtered by ozone. This natural characteristic adds value in that the material is stable while being produced and processed on earth while sublimating when exposed to the space UV environment.

As described herein, the foam is decomposable by high energy electromagnetic radiation, preferably UV radiation, typically less than about 1,000 nm (1 μm or $10^{-6}$ meters) and preferably less than about 100 nm ($10^{-7}$ meters). In a preferred embodiment, the high energy comprises low wave UV, less than 290 nm. While the description is given in terms of UV radiation, those skilled in this art will appreciate that higher energy photons, including, but not limited to, X-rays, gamma rays, and cosmic rays, may also be employed in decomposing the foam.

Several materials are available to choose from for the development of UV catalyzed sublimating media development. Currently, industry uses short chain (plastics) and long chain (rubber) polymers, vinyl chlorides, and poly-carbons as UV reactive bases. The unique properties of these materials, such as strength, toughness, and tear resistance, arise because of the very high molecular weight of the molecules, which are held together by chemical (covalent) bonds between the atoms. An ordinary polyethylene film has a molecular weight around 300,000. By way of comparison carbon dioxide and water have molecular weights of 44 and 18, respectively. By definition, the degradation of a polymer such as polyethylene results from the breaking of carbon bonds in each molecule with a lowering of the molecular weight and a loss of mechanical properties, such as tensile strength, toughness, and percentage of elongation. Accordingly, products containing decomposable additives have thus exhibited a substantial decrease of molecular weight from one quarter million to an average of less than 4,000, leading to the rapid breakdown of the material. The effect of this molecular breakdown is an exothermic reaction, thus preserving the conservation of mass and energy that governs the science. Examples of suitable organic foam bases include, but are not limited to, expanded or extruded polystyrenes, polyethylenes, polypropylenes, propylene copolymers, and polyurethanes.

A number of factors can initiate the degradation of degradable polythene packaging, such as, ultraviolet light, heat, oxygen, and film stress (such as pulling and tearing). Once degradation is initiated, it will continue. Generally, oxygen is required in the catalyzed event; however, recently, scientists have substituted atmosphere with peroxides contained within the foam substance to accelerate the process independent of atmosphere. The eventual result of the degradation is the release of alcohols, carbon dioxide, and water (post-reactive by-products).

A simple example of such a reaction can be expressed with the example of the creation of ozone. Ozone is an excellent oxidizer and will aggressively attack organic foams. Ozone can be formed when a mixture of $O_2$ and $NO_2$ is exposed to bright light:

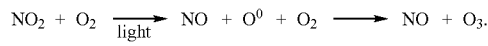

$$NO_2 + O_2 \xrightarrow{\text{light}} NO + O^0 + O_2 \longrightarrow NO + O_3.$$

The single oxygen atom $O^0$ formed as an intermediate in this process is extremely reactive and readily attaches to any scavenging molecule. In the case of atmosphere, it attaches with readily available $O_2$, forming ozone, $O_3$. This is one simple example of a light irradiated chemical reaction. Equally as simple and directly applicable is the UV light synthesized reaction of ozone and dioxide molecules disassociating under low frequency wavelengths. This fundamental chemical rule is the key to releasing oxygen molecules that will attack and break down the foam. In one embodiment, the foam is embedded with an oxidizer, or free radical initiator, that would be energized by low wave (less than 290 nm) UV radiation. Once the UV energy has released the oxidizer in the form of a free radical, the absence of $O_2$ or other scavengers in space insures these free radicals will continue to attack the only available scavengeable molecule, namely, the foam.

The foam is thus desirably embedded with an oxidizer that is energized by low wave (<290 nm to 240 nm) UV radiation. Two chemicals and their common compounds qualify as readily available oxidizers than can be effectively released via UV light to break down organic foams; these are oxygen and fluorine. Examples of the resulting chemical compounds, i.e., free radical initiators, that may be used to decompose the foam include, but are not limited to, aluminum oxide, hydrogen peroxide, sulfur trioxide, sulfur fluoride, nitrous oxide, benzil dimethyl ketal, trimethylbenzophenone, α-hydroxy ketone, benzophenone, benzoyl peroxide, di-iso-propyl peroxydicarbonate, di-sec-butyl peroxydicarbonate, tert-butylperoxy pivalate, caprylyl peroxide, lauroyl peroxide, acetyl peroxide, tert-butyl peroxyisobutyrate, p-chlorobenzoyl peroxide, hydroxyheptyl peroxide, di-tert-butyl diperphthalate, tert-butyl peracetate, t-butylperoxy iso-propyl carbonate, tert-butyl perbenzoate, dicumyl peroxide, tert-butyl hydroperoxide, methyl ethyl ketone peroxide, di-tert-butyl peroxide, p-menthane hydroperoxide, pinane hydroperoxide, cumene hydroperoxide, 2,5-dimethyl-2,5-dihydroperoxide, tert-butyl hydroperoxide-90, ammonium persulfate, potassium persulfate, azo compounds such as 2,2'-azobisiso-butyronitrile, 4,4'-azobis(cyclohexanecarbonitrile), 4,4'-azobis(4-cyanovaleric acid) and 2,2'-azobis(2-methylpropane), TRIGONOX 21 (tert-butyl peroxy-2-ethylhexanoate, available from Akzo & Nobel), and PERKADOX 16 (di(tert-butylcyclohexyl)peroxydicarbonate, available from Akzo & Nobel), and organic peroxides such as dicumyl peroxide, dioctanoyl peroxide, dimyristyl peroxide, dilauroyl peroxide, 1,1-di(tert-butylperoxycyclohexane), tert-butyl peroxydiethylacetate, and cumyl hydroperoxide. In some embodiments, benzoyl peroxides are preferred for providing the release of free radical initiators because of their high reactivity.

The foam is doped to abate and attenuate specific environmental frequencies in order to successfully support space hardware being boosted into orbit. Once in orbit, the payload shroud opens, thereby exposing the foam to the intense UV environment of space. This UV energy catalyzes the decomposition of the foam, thereby exposing the kinetic media embedded in the foam. As mentioned earlier, gamma, X-rays, and cosmic rays may also be used to catalyze the decomposition of the foam.

Suitable organic foam bases are: expanded or extruded polystyrene, polyethylene, polypropylene, propylene copolymers, and polyurethanes.

Current State of the Art:

Currently, single element hit-to-kill kinetic energy weapons have been selected over the shotgun approach outlined above. These elements are complex and require precise seeking, tracking, guidance, and control in order to work. The issues with the shotgun approach are: controlling the dispersion of the kinetic media over a long ballistic travel time to target so as to impart enough energy to ensure its destruction and a delivery mechanism light and simple enough to compete with the current state of the art.

Currently, the sublimating foam industry is limited to decomposing packaging materials used to protect earth-bound payloads against the physical environment of transportation. Recently, environmental pressures have mandated that organic foams such as polystyrene not only decompose in the atmosphere but also under water and soil where there are limited oxygen molecules available. For this reason, recent effort has been made to coat packaging materials with oxidizers that require very little light or heat to release and attack the foam.

FIG. 1 illustrates one embodiment of a typical space mission wherein the foam media encapsulates kinetic media, comprising a shrapnel warhead. The mission is to launch this shrapnel warhead against any desired target. Once the foam is exposed to low wave UV energy, the UV energy sublimates, or decomposes, the encapsulating foam, thereby exposing the kinetic media to be impacted on the target. The encapsulation does not require any moving parts and acts as a dispersion control device, thereby enabling the kinetic media to remain "closely packed" in order to deliver as much energy on the target as possible. In the above scenario, the encapsulated media shot is the first shot in a shoot-shoot strategy and acts as a clearing mechanism to eliminate decoys often employed by enemy ICBMs. The elimination of these decoys removes the discrimination effort of the second shot, thereby greatly reducing the complexity of its mission and consequently increasing the probability of success.

As illustrated in FIG. 1, a first shot 100 comprises a rocket-propelled vehicle 110 containing a payload 120 comprising kinetic media 122 dispersed in a decomposable foam 124. The payload 120 is contained within a clamshell shroud 130 until release of the payload is desired, at which time, the clamshell shroud opens, releasing the payload. It is intended that the kinetic media 122 intercept the decoys (not shown) accompanying the incoming missile (not shown) at location 140 at an altitude that is essentially space-like, where UV and other suitable radiation can decompose the foam. FIG. 1A depicts the payload 120 prior to foam decomposition and subsequent to foam decomposition, wherein the kinetic media 122 is released as the foam 124 is decomposed to a smaller size (at 124'), thus reducing the size of the payload (at 120'). Eventually, the foam 124' is totally decomposed, and the payload 120' disappears, leaving only the kinetic media 122.

A second shot 150 comprises a rocket-propelled vehicle 160 containing an intercept kinetic warhead 170, initially protected by a clamshell shroud 180. Once the decoys have been removed by the kinetic media 122 at location 140, the intercept warhead 170 can target and destroy the incoming missile at location 142.

The scenario depicted in FIGS. 1 and 1A is directed to one embodiment, namely, the shoot-shoot scenario in which the foam-encapsulated media (payload 120) is one of two vehicles launched, with the first vehicle (containing the foam-encapsulated media) intended to destroy the decoy(s) and the second vehicle intended to destroy the incoming missile. In other embodiments, the vehicle containing the foam-encapsulated media is the only vehicle launched, and is intended to destroy both the decoy(s) and the incoming missile. In this embodiment, there is sufficient mass of the kinetic media 122 to accomplish this intention. The determination of which scenario to use is left to the defense, and, based on the teachings herein, that defense can devise the best strategy, along with the size of the payload 120 and amount of kinetic media 122 to defend against an incoming missile and one or more possible decoys.

In many cases, the foam decomposes at pre-determined rates so as to preserve a required density of kinetic media on target. Knowing the wavelength range of the high energy radiation and its intensity and the decomposition rate of the particular foam used when exposed to that high energy radiation enables the designer to configure the payload so that upon decomposition of the foam, the required density of the kinetic media is sufficient to accomplish the mission.

The advantages of the use of sublimating structural payload foam for space applications include:

- Weight: Current satellite and space payload materials are about 30 times heavier than expanded organic foams. Weight is directly proportional to cost in delivering hardware into orbit. Currently, it costs approximately $20,000/lb to $100,000/lb to place hardware into Earth synchronous orbit.
- Cost: It is roughly estimated that employing an encapsulated kinetic media defense KV would be one-fifth the cost of the current shoot-shoot scenario employing two active seeking hit-to-kill KVs. This translates to multiple millions of dollars per mission.
- Increased Probability of Kill: The elimination of ICBM decoys greatly increases the probability of success against an incoming ICBM by simplifying the mission of the kinetic warhead designed to impact the "real" target. Discrimination of the real target is widely agreed to be the most difficult problem in defeating incoming ICBMs. The teachings herein provide a helpful ingredient for an effective midcourse defense system.
- Space Debris: The sublimating foam leaves no hard space debris and this particular embodiment could be used to remove existing space debris.

Targets of opportunity include, but are not limited to, ICBMs, ICBM decoys, remote vehicles, satellites, and unwanted space debris (including use to de-orbit out-of-commission satellites). Particular applications are directed to destroying decoys and satellites, since they require less kinetic energy to destroy.

The anti-weapon weapon technology disclosed herein could be "pre-shot" at incoming remote busses, or vehicles, (RVs) that have deployed their decoys. This pre-deployment, or pre-shot, would aid the follow-on kill vehicle (KV) 170 by doing the discrimination job for it, by destroying any decoy and fake incoming missiles at location 140, and allow the KV to deal only with the real incoming missile at location 142.

Organic foams have been disclosed herein. However, inorganic foams may alternatively be used, or used in doped conjunction with the organic material in order to modify/control/improve the decomposition rate and the strength of the foam composite.

EXAMPLE

An extruded block of polystyrene is placed into an atmosphere-controlled and light-controlled protective chamber having a chamber window. The chamber is back-filled with argon to purge earth atmosphere. The polystyrene is injected with an oxide, such as hydrogen peroxide, aluminum oxide, or sulfur trioxide. Material stability is verified. A vacuum is drawn to simulate space. Material stability is again verified. The chamber window is exposed to high frequency UV light (mercury-vapor lamp simulating low wave UV). Material stability is again verified. The chamber window is exposed to low frequency UV light. Sublimation of the foam is observed.

The above experiment was done minus the vacuum. Hydrogen peroxide bath was used. A mercad-vapor lamp was used. The material decomposed in seconds under the mercury light source.

INDUSTRIAL APPLICABILITY

The use of decomposable foam is expected to find use in providing a lightweight mechanism for propelling kinetic media in space to intercept incoming missiles and other targets, such as satellites and space debris.

What is claimed is:

1. Kinetic media payload for launching into space by a vehicle to intercept a target, said kinetic media payload comprising kinetic media at least partially surrounded by a foam decomposable into post-reactive by-products comprising alcohols, carbon dioxide, and water by high energy electromagnetic radiation that has a wavelength of less than about $10^{-7}$ meters, said foam including a free radical initiator.

2. The kinetic media payload of claim 1 wherein said high energy electromagnetic radiation is ultraviolet radiation.

3. The kinetic media payload of claim 2 wherein said high energy electromagnetic radiation is low wave ultraviolet radiation of less than 290 nanometers.

4. The kinetic media payload of claim 1 wherein said decomposable foam comprises a polymer selected from the group consisting of expanded polystyrenes, extruded polystyrenes, polyethylenes, polypropylenes, propylene copolymers, and polyurethanes.

5. The kinetic media payload of claim 1 wherein said free radical initiator is selected from the group consisting of aluminum oxide, hydrogen peroxide, sulfur trioxide, sulfur fluoride, nitrous oxide, benzil dimethyl ketal, benzoyl peroxide, di-iso-propyl peroxydicarbonate, di-sec-butyl peroxydicarbonate, tert-butylperoxy pivalate, caprylyl peroxide, lauroyl peroxide, acetyl peroxide tert-butyl peroxyisobutyrate, p-chlorobenzoyl peroxide, hydroxyheptyl peroxide, di-tert-butyl diperphthalate, tert-butyl peracetate, t-butylperoxy iso-propyl carbonate, tert-butyl perbenzoate, dicumyl peroxide, tert-butyl hydroperoxide, methyl ethyl ketone peroxide, di-tert-butyl peroxide, p-menthane hydroperoxide, pinane hydroperoxide, cumene hydroperoxide, 2,5-dimethyl-2,5-di-hydroperoxide, tert-butyl hydroperoxide-90, ammonium persulfate, potassium persulfate, azo compounds, tert-butyl peroxy-2-ethylhexanoate, and di(tert-butylcyclohexyl) peroxydicarbonate, and organic peroxides.

6. The kinetic media payload of claim 5 wherein said azo compounds are selected from the group consisting of 2,2'-azobisiso-butyronitrile, 4,4'-azobis(cyclohexanecarbonitrile), 4,4'-azobis(4-cyano-valeric acid) and 2,2'-azobis(2-methylpropane), and wherein said organic peroxides are selected from the group consisting of dicumyl peroxide, dioctanoyl peroxide, dimyristyl peroxide, dilauroyl peroxide, 1,1-di (tert-butylperoxycyclohexane), tert-butyl peroxydiethylacetate, and cumyl hydroperoxide.

7. The kinetic media payload of claim 1 wherein said free radical initiator is present in an amount sufficient to initiate decomposition of said decomposable foam upon exposure to said high energy radiation.

8. The kinetic media payload of claim 1 wherein said kinetic media are embedded within said decomposable foam.

9. The kinetic media payload of claim 8 wherein said kinetic media are selected from the group consisting of silicon, silicon alloys, oxides, flak, ferrous shrapnel, non-ferrous shrapnel, plastics, long chain polymers, explosives, and organics with a density sufficient to destroy said target.

10. The kinetic media payload of claim 1 wherein said target is selected from the group consisting of inter-continental ballistic missiles, inter-continental ballistic missile decoys, remote vehicles, satellites, and unwanted space debris.

11. A vehicle for launching a payload comprising kinetic media into space to intercept a target, said payload contained in a decomposable foam that at least partially surrounds said payload, wherein said decomposable foam is decomposable into post-reactive by-products comprising alcohols, carbon dioxide, and water by exposure to high energy electromagnetic radiation that has a wavelength of less than about $10^{-7}$ meters, said foam including a free radical initiator.

12. The vehicle of claim 11 wherein said high energy electromagnetic radiation is ultraviolet radiation.

13. The vehicle of claim 12 wherein said high energy electromagnetic radiation is low wave ultraviolet radiation of less than 290 nanometers.

14. The vehicle of claim 11 wherein said decomposable foam comprises a polymer selected from the group consisting of expanded polystyrenes, extruded polystyrenes, polyethylenes, polypropylenes, propylene copolymers, and polyurethanes.

15. The vehicle of claim 11 wherein said free radical initiator is selected from the group consisting of aluminum oxide, hydrogen peroxide, sulfur trioxide, sulfur fluoride, nitrous oxide, benzil dimethyl ketal, benzoyl peroxide, di-iso-propyl peroxydicarbonate, di-sec-butyl peroxydicarbonate, tert-butylperoxy pivalate, caprylyl peroxide, lauroyl peroxide, acetyl peroxide, tert-butyl peroxyisobutyrate, p-chlorobenzoyl peroxide, hydroxyheptyl peroxide, di-tert-butyl diperphthalate, tert-butyl peracetate, t-butylperoxy iso-propyl carbonate, tert-butyl perbenzoate, dicumyl peroxide, tert-butyl hydroperoxide, methyl ethyl ketone peroxide, di-tert-butyl peroxide, p-menthane hydroperoxide, pinane hydroperoxide, cumene hydroperoxide, 2,5-dimethyl-2,5-di-hydroperoxide, tert-butyl hydroperoxide-90, ammonium persulfate, potassium persulfate, azo compounds, tert-butyl peroxy-2-ethylhexanoate, and di(tert-butylcyclohexyl)peroxydicarbonate, and organic peroxides.

16. The vehicle of claim 15 wherein said azo compounds are selected from the group consisting of 2,2'-azobisiso-butyronitrile, 4,4'-azobis(cyclohexanecarbonitrile), 4,4'-azobis(4-cyano-valeric acid) and 2,2'-azobis(2-methyipropane), and wherein said organic peroxides are selected from the group consisting of dicumyl peroxide, dioctanoyl peroxide, dimyristyl peroxide, dilauroyl peroxide, 1,1-di (tert-butylperoxycyclohexane), tert-butyl peroxydiethylacetate, and cumyl hydroperoxide.

17. The vehicle of claim 11 wherein said free radical initiator is present in an amount sufficient to initiate decomposition of said decomposable foam upon exposure to said high energy radiation.

18. The vehicle of claim 11 wherein said kinetic media are embedded within said decomposable foam.

19. The vehicle of claim 18 wherein said kinetic media are selected from the group consisting of silicon, silicon alloys, oxides, flak, ferrous shrapnel, non-ferrous shrapnel, plastics, long chain polymers, explosives, and organics with a density sufficient to destroy said target.

20. The vehicle of claim 11 wherein said target is selected from the group consisting of inter-continental ballistic missiles, inter-continental ballistic missile decoys, remote vehicles, satellites, and unwanted space debris.

21. A method for delivering a payload comprising kinetic media during launch into space to intercept a target, said method comprising:

protecting said payload by at least partially surrounding said kinetic media with decomposable foam that is decomposable into post-reactive by-products comprising alcohols, carbon dioxide, and water by high energy electromagnetic radiation that has a wavelength of less than about $10^{-7}$ meters, said foam including a free radical initiator;

launching said payload while maintaining its structural integrity and alignment; and decomposing said foam once said payload is in space by exposure to said high energy electromagnetic radiation.

22. The method of claim 21 wherein said high energy electromagnetic radiation is ultraviolet radiation.

23. The method of claim 22 wherein said high energy electromagnetic radiation is low wave ultraviolet radiation of less than 290 nanometers.

24. The method of claim 21 wherein said decomposable foam comprises a polymer selected from the group consisting of expanded polystyrenes, extruded polystyrenes, polyethylenes, polypropylenes, propylene copolymers, and polyurethanes.

25. The method of claim 21 wherein said free radical initiator is selected from the group consisting of aluminum oxide, hydrogen peroxide, sulfur trioxide, sulfur fluoride, nitrous oxide, benzil dimethyl ketal, benzoyl peroxide, di-isopropyl peroxydicarbonate, di-sec-butyl peroxydicarbonate, tert-butylperoxy pivalate, caprylyl peroxide, lauroyl peroxide, acetyl peroxide, tert-butyl peroxyisobutyrate, p-chlorobenzoyl peroxide, hydroxyheptyl peroxide, di-tert-butyl diperphthalate, tert-butyl peracetate, t-butylperoxy iso-propyl carbonate, tert-butyl perbenzoate, dicumyl peroxide, tert-butyl hydroperoxide, methyl ethyl ketone peroxide, di-tert-butyl peroxide, p-menthane hydroperoxide, pinane hydroperoxide, cumene hydroperoxide, 2,5-dimethyl-2,5-dihydroperoxide, tert-butyl hydroperoxide-90, ammonium persulfate, potassium persulfate, azo compounds, tert-butyl peroxy-2-ethylhexanoate, and di(tert-butylcyclohexyl)peroxydicarbonate, and organic peroxides.

26. The method of claim 25 wherein said azo compounds are selected from the group consisting of 2,2'-azobisiso-butyronitrile, 4,4'-azobis(cyclohexanecarbonitrile), 4,4'-azobis (4-cyano-valeric acid) and 2,2'-azobis(2-methyipropane), and wherein said organic peroxides are selected from the group consisting of dicumyl peroxide, dioctanoyl peroxide, dimyristyl peroxide, dilauroyl peroxide, 1,1-di (tert-butylperoxycyclohexane), tert-butyl peroxydiethylacetate, and cumyl hydroperoxide.

27. The method of claim 21 wherein said free radical initiator is added in an amount sufficient to initiate decomposition of said decomposable foam upon exposure to said high energy radiation.

28. The method of claim 21 wherein said kinetic media are embedded within said decomposable foam.

29. The method of claim 28 wherein said kinetic media are selected from the group consisting of silicon, silicon alloys, oxides, flak, ferrous shrapnel, non-ferrous shrapnel, plastics, long chain polymers, explosives, and organics with a density sufficient to destroy said target.

30. The method of claim 21 wherein said target is selected from the group consisting of inter-continental ballistic missiles, inter-continental ballistic missile decoys, remote vehicles, satellites, and unwanted space debris.

31. The kinetic media payload of claim 1 wherein said foam is decomposable in space.

32. The vehicle of claim 11 wherein said foam is decomposable in space.

33. The method of claim 21 wherein said foam is decomposable in space.

34. The kinetic media payload of claim 1 wherein said foam decomposes by sublimation.

35. The vehicle of claim 11 wherein said foam decomposes by sublimation.

36. The method of claim 21 wherein said foam decomposes by sublimation.

37. The payload of claim 1 wherein said free radical initiator generates an oxygen atom free radical upon exposure to said high energy electromagnetic radiation that causes decomposition of said foam.

38. The vehicle of claim 11 wherein said free radical initiator generates an oxygen atom free radical upon exposure to said high energy electromagnetic radiation that causes decomposition of said foam.

39. The method of claim 21 wherein said free radical initiator generates an oxygen atom free radical upon exposure to said high energy electromagnetic radiation that cause decomposition of said foam.

* * * * *